(12) United States Patent
Chimura

(10) Patent No.: US 9,542,308 B2
(45) Date of Patent: Jan. 10, 2017

(54) ELECTRONIC DEVICE THAT COMPLETES EXECUTION OF TASK IMMEDIATELY, METHOD FOR MANAGING MEMORY, AND RECORDING MEDIUM

(71) Applicant: KYOCERA Document Solutions Inc., Osaka (JP)

(72) Inventor: Tetsuyuki Chimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/677,517

(22) Filed: Apr. 2, 2015

(65) Prior Publication Data

US 2015/0293838 A1 Oct. 15, 2015

(30) Foreign Application Priority Data

Apr. 14, 2014 (JP) ................................ 2014-083216

(51) Int. Cl.
*G06F 12/00* (2006.01)
*G06F 12/02* (2006.01)

(52) U.S. Cl.
CPC ......... *G06F 12/023* (2013.01); *G06F 12/0284* (2013.01); *G06F 2212/1044* (2013.01)

(58) Field of Classification Search
None
See application file for complete search history.

(56) References Cited

U.S. PATENT DOCUMENTS

| 7,286,256 | B2 * | 10/2007 | Herbert | .............. | H04N 1/00132 |
| | | | | | 358/1.15 |
| 2009/0210649 | A1 * | 8/2009 | Wan | .................... | G06F 9/30087 |
| | | | | | 711/170 |

FOREIGN PATENT DOCUMENTS

JP 9-62566 A 3/1997

\* cited by examiner

*Primary Examiner* — David X Yi
*Assistant Examiner* — Craig Goldschmidt
(74) *Attorney, Agent, or Firm* — Stein IP, LLC

(57) ABSTRACT

An electronic device includes a memory, a first-region allocating unit, and a second-region allocating unit. The first-region allocating unit allocates first regions in a region of the memory. The first regions are for execution of tasks. The second-region allocating unit allocates second regions in the first regions. The second region is to be actually used for execution of a task. If the first-region allocating unit has previously allocated a first region for a task identical in type to a new task as an execution target, the first-region allocating unit cancels allocation of a first region for the new task. When the allocation of a first region for the new task is cancelled, the second-region allocating unit allocates, in the first region for the task identical in type to the new task, a second region for the new task.

3 Claims, 7 Drawing Sheets

ELECTRONIC DEVICE THAT COMPLETES EXECUTION OF TASK IMMEDIATELY, METHOD FOR MANAGING MEMORY, AND RECORDING MEDIUM

INCORPORATION BY REFERENCE

This application is based upon, and claims the benefit of priority from, corresponding Japanese Patent Application No. 2014-083216 filed in the Japan Patent Office on Apr. 14, 2014, the entire contents of which are incorporated herein by reference.

BACKGROUND

Unless otherwise indicated herein, the description in this section is not prior art to the claims in this application and is not admitted to be prior art by inclusion in this section.

Even when there is no free space in the region of a memory at the time of the request from a task for using the memory, a typical electronic device forcibly deallocates the region allocated to another task and instantly assigns the deallocated region to the task requesting for using the memory.

SUMMARY

An electronic device according to an aspect of the present disclosure includes a memory, a first-region allocating unit, and a second-region allocating unit. The first-region allocating unit allocates first regions in a region of the memory. The first regions are for execution of tasks. The second-region allocating unit allocates second regions in the first regions. The second region is to be actually used for execution of a task. If the first-region allocating unit has previously allocated a first region for a task identical in type to a new task as an execution target, the first-region allocating unit cancels allocation of a first region for the new task. When the allocation of a first region for the new task is cancelled, the second-region allocating unit allocates, in the first region for the task identical in type to the new task, a second region for the new task.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
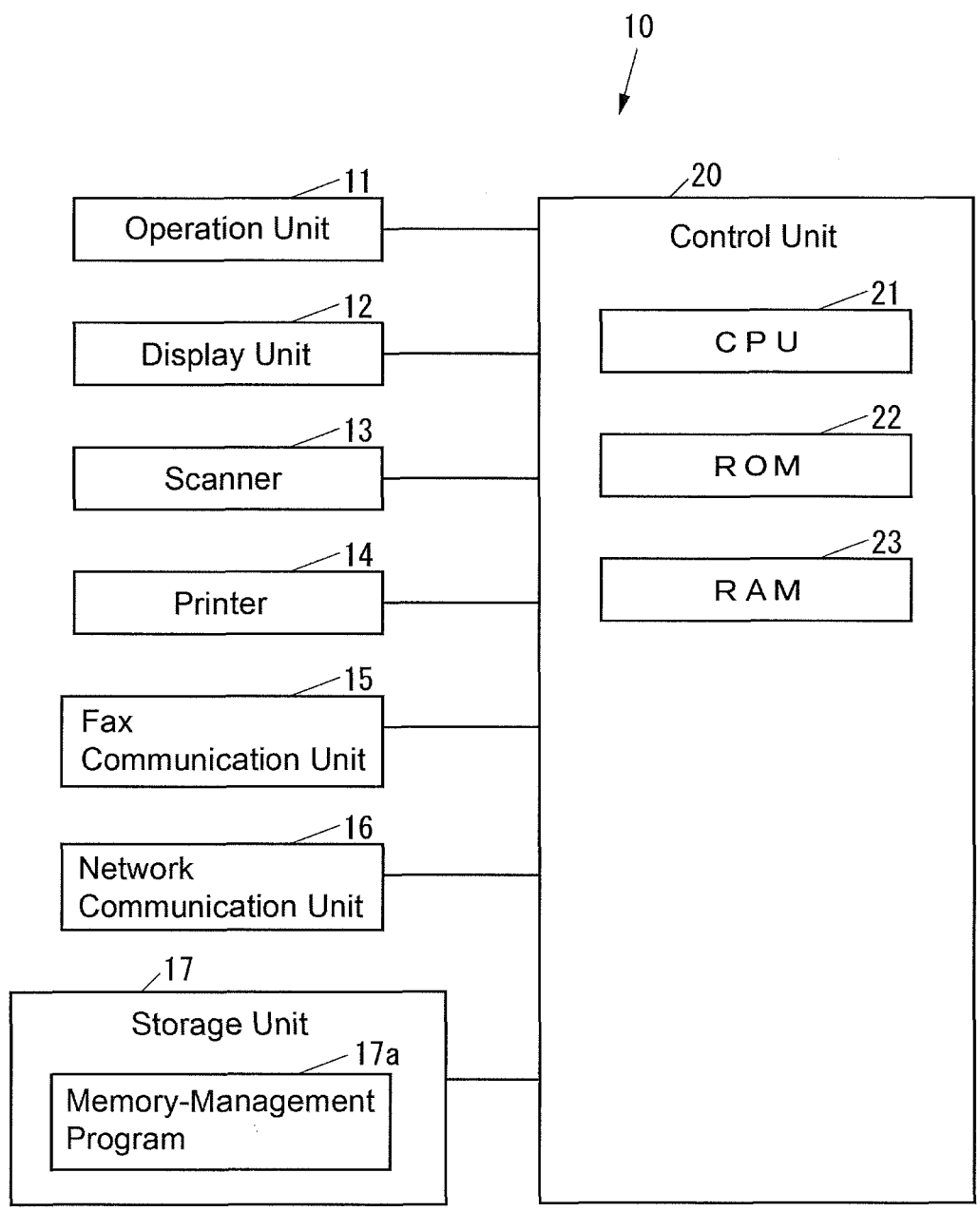
FIG. 1 is a schematic diagram illustrating a configuration of an MFP according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the accompanying drawings.

Firstly, a description will be given of a configuration of a Multifunction Peripheral (MFP) as an electronic device according to this embodiment.

FIG. 1 is a schematic diagram illustrating the configuration of an MFP 10 according to this embodiment.

As illustrated in FIG. 1, the MFP 10 includes an operation unit 11, a display unit 12, a scanner 13, a printer 14, a fax communication unit 15, a network communication unit 16, a storage unit 17, and a control unit 20. The operation unit 11 may be an input device such as a button for inputting various operations by a user. The display unit 12 may be a display device such as a Liquid Crystal Display (LCD) that displays various information. The scanner 13 may be a reading device that reads an image from a document. The printer 14 may be a print device that executes a print job on a recording medium such as a paper sheet. The fax communication unit 15 may be a fax device that performs fax communication with an external facsimile device (not illustrated) via a communication line such as a dial-up line. The network communication unit 16 may be a network communication device that communicates with an external device (not illustrated) via the network such as a Local Area Network (LAN) and/or the Internet. The storage unit 17 may be a non-volatile storage device such as an Electrically Erasable Programmable Read Only Memory (EEPROM) and a Hard Disk Drive (HDD) that stores various data. The control unit 20 controls the entire MFP 10.

The control unit 20 includes, for example, a Central Processing Unit (CPU) 21, a Read Only Memory (ROM) 22, which is a non-transitory recording medium and stores a program and various data, and a Random Access Memory (RAM) 23, which is a memory used as a work area of the CPU 21. The CPU 21 executes the program stored in the ROM 22 or the storage unit 17.

The storage unit 17 stores a memory-management program 17a for managing the RAM 23. The memory-management program 17a may be installed on the MFP 10 at production stage of the MFP 10, may be additionally installed on the MFP 10 from a storage medium such as an SD card and a Universal Serial Bus (USB) memory, or may be additionally installed on the MFP 10 from the network.

Figure 2:
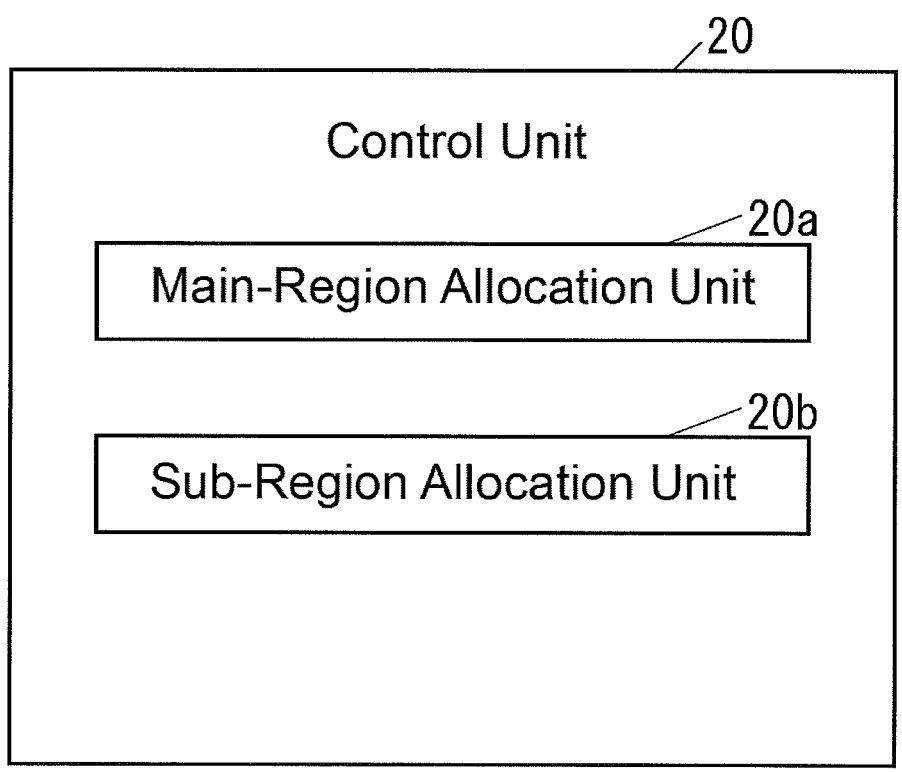
FIG. 2 is a schematic diagram illustrating a function configuration of a control unit according to the one embodiment.

FIG. 2 is a block diagram illustrating a function of the control unit 20.

The control unit 20 functions as a main-region allocating unit 20a and a sub-region allocating unit 20b as illustrated in FIG. 2 by execution of the memory-management program 17a stored in the storage unit 17. The main-region allocating unit 20a is a first-region allocating unit that allocates a main region as a first region for executing a task in a region of the RAM 23 (see FIG. 1). The sub-region allocating unit 20b is a second-region allocating unit that allocates a sub region as a second region actually used for executing a task in the main region allocated by the main-region allocating unit 20a.

Next, a description will be given of the operation of the MFP 10 when managing the RAM 23.

Figure 3:
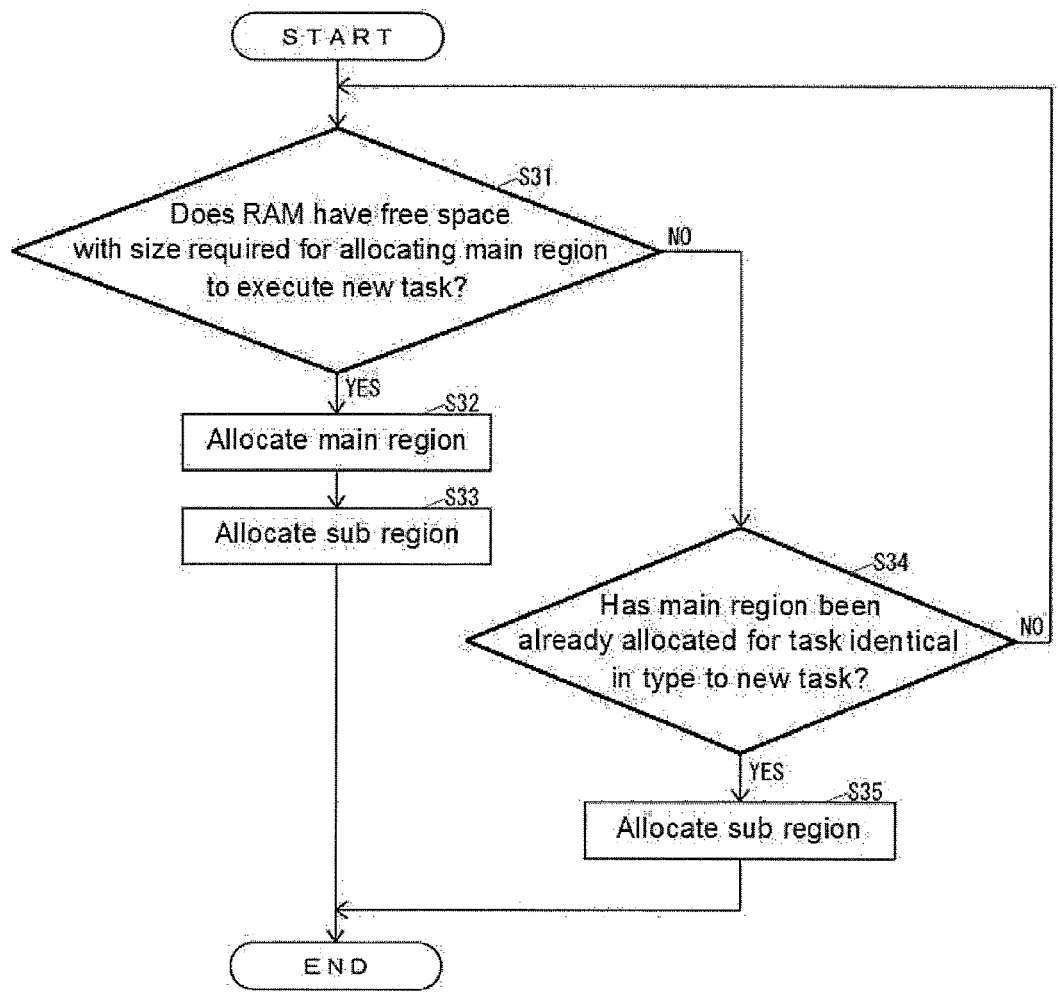
FIG. 3 is a flowchart of an operation of the MFP according to the one embodiment when a RAM is managed.

FIG. 3 is a flowchart of the operation of the MFP 10 when managing the RAM 23.

The control unit 20 of the MFP 10 executes the operation illustrated in FIG. 3 when the use of the RAM 23 is requested by a task.

As illustrated in FIG. 3, the main-region allocating unit 20a of the control unit 20 determines whether or not the RAM 23 has a free space with a size required for allocating the main region to execute the new task, which requests the use of the RAM 23, (Step S31).

Here, when, for example, the new task is a task for printing by the printer 14 based on print data received via the network communication unit 16, that is, a task for imaging and printing an image, the main-region allocating unit 20a determines the size required for allocating the main region to execute this task based on the size of the maximum paper sheet assumed in this task. When, for example, the new task is a task such as copying using the scanner 13, the main-region allocating unit 20a determines the size required for allocating the main region to execute this task based on the size of the document read by the scanner 13.

When the main-region allocating unit 20a determines that the RAM 23 has the free space with the size required for allocating the main region to execute the new task in Step S31, the main-region allocating unit 20a additionally allocates the main region for executing the new task (Step S32).

Here, the main-region allocating unit 20a allocates the main region for each of processing items in a task. For example, when the new task is a task for imaging and printing an image, the main-region allocating unit 20a allocates the main region (hereinafter referred to as "imaging region") for a imaging process and the main region (hereinafter referred to as "printing region") for a printing process.

Subsequently, the sub-region allocating unit 20b of the control unit 20 allocates the sub region actually used for executing the new task in the main region allocated in Step S32 (Step S33).

Here, the sub-region allocating unit 20b allocates the sub region for each of processing items in a task, in the main region allocated for each of processing items in the task. For example, when the new task is a task for imaging and printing an image, the sub-region allocating unit 20b allocates the sub region for a imaging process in the imaging region and allocates the sub region for a printing process in the printing region.

When the main-region allocating unit 20a determines that the RAM 23 does not have the free space with the size required for allocating the main region to execute the new task in Step S31, the main-region allocating unit 20a determines whether or not the main region has been already allocated for a task identical in type to the new task as the execution target (Step S34).

When it is determined that the main region has been already allocated for the task identical in type to the new task as the execution target in Step S34, the sub-region allocating unit 20b allocates the sub region for the new task in the main region for the task identical in type to the new task (Step S35). Here, the sub-region allocating unit 20b allocates the sub region for each of processing items in a task in the main region allocated for each of processing items in the task.

When the main-region allocating unit 20a has determined that the main region has not been already allocated for the task identical in type to the new task as the execution target in Step S34, the main-region allocating unit 20a executes the process in Step S31.

When the process in Step S33 or Step S35 is terminated, the control unit 20 terminates the operation illustrated in FIG. 3.

Here, every time the process in a task is terminated, the control unit 20 deallocates the sub region allocated for this process. Subsequently, when all the processes in the task are terminated and all the sub regions are deallocated in all the main regions allocated for the respective processing items in this task, the control unit 20 deallocates these main regions.

The following describes the specific example when the MFP 10 continuously executes a task 1 and a task 2 as the task for imaging and printing an image.

Figure 4A:
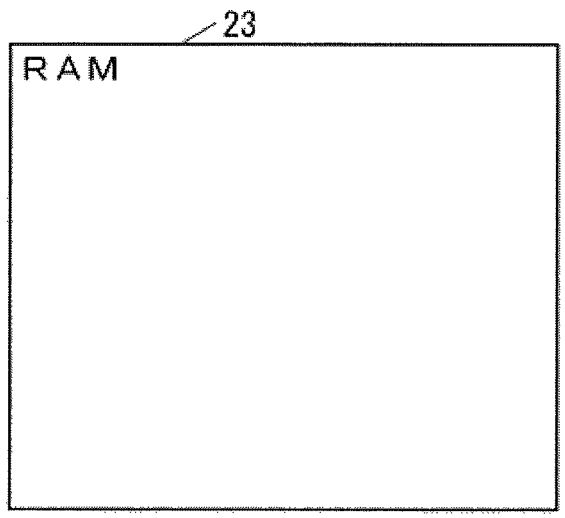
FIG. 4A is a schematic diagram illustrating an example of a state of the RAM according to the one embodiment.

Before the task 1 requests the control unit 20 for the use of the RAM 23, the RAM 23 is assumed to be in the state where the entire region is a free space as illustrated in FIG. 4A.

Firstly, when the task 1 requires the use of the RAM 23, the main-region allocating unit 20a determines that the RAM 23 has the free space with the size required for allocating the main region to execute the task 1 in Step S31 and additionally allocates the main region for the task 1 (Step S32). That is, the main-region allocating unit 20a allocates a guaranteed memory 23a illustrated in FIG. 4B to the RAM 23. Subsequently, the guaranteed memory 23a includes a imaging region 23b and a printing region 23c as respective main regions.

Subsequently, the control unit 20 executes the imaging process of the task 1. Accordingly, the sub-region allocating unit 20b allocates the sub region (hereinafter referred to as "task1-imaging use region") actually used for executing the imaging process of the task 1 in the imaging region 23b (Step S33). That is, the sub-region allocating unit 20b allocates a task1-imaging use region 23d in the imaging region 23b as illustrated in FIG. 4C.

Figure 5A:
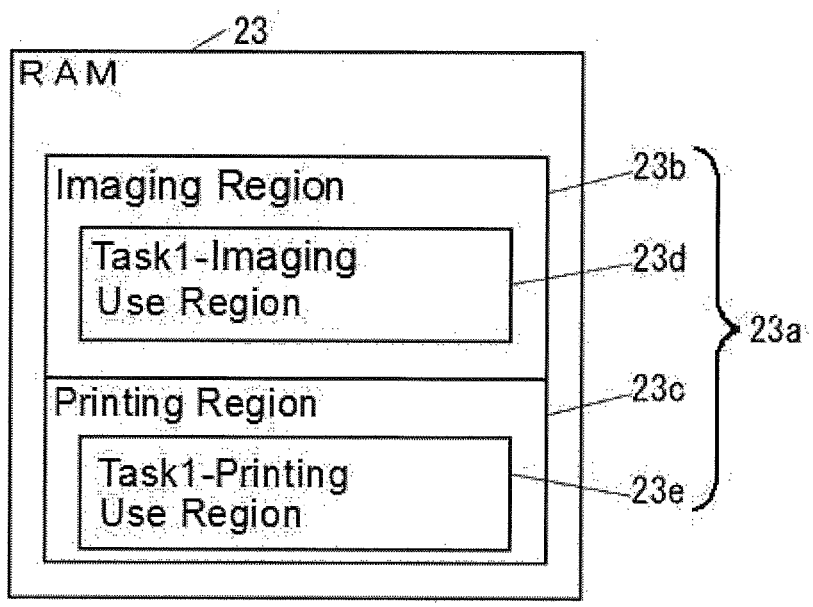
FIG. 5A is a schematic diagram illustrating a state where the task1-printing use region is allocated from the state illustrated in FIG. 4C.

Subsequently, when the execution of the imaging process of the task 1 is terminated, the control unit 20 executes the printing process of the task 1. Accordingly, the sub-region allocating unit 20b allocates the sub region (hereinafter referred to as "task1-printing use region") actually used for executing the printing process of the task 1 in the printing region 23c (Step S33). That is, the sub-region allocating unit 20b allocates a task1-printing use region 23e in the printing region 23c as illustrated in FIG. 5A.

Figure 5B:
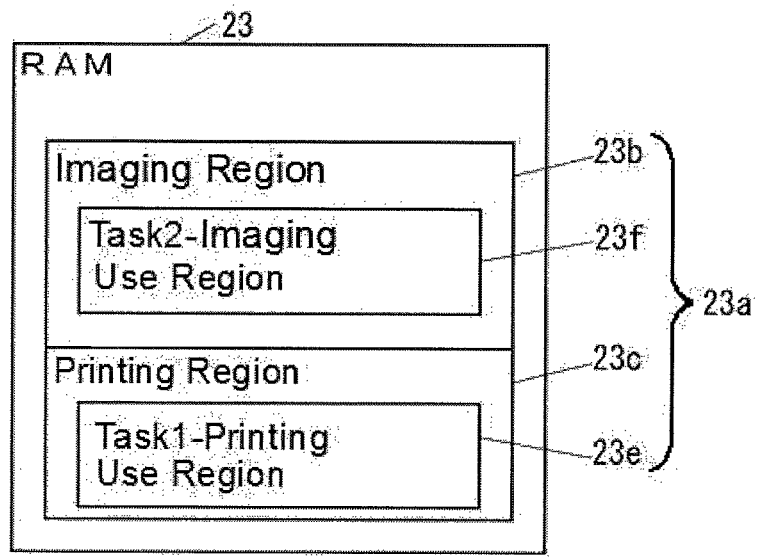
FIG. 5B is a schematic diagram illustrating a state where a task2-imaging use region is allocated instead of the task1-imaging use region from the state illustrated in FIG. 5A.

When the task 2 requires the use of the RAM 23, the main-region allocating unit 20a determines that the RAM 23 does not have the free space with the size required for allocating the main region to execute the task 2 in Step S31 and determines that the main region has been already allocated for the task identical in type to the task 2 as the execution target, that is, the task for imaging and printing an image by the MFP 10 in Step S34. Subsequently, when the imaging process of the task 1 is terminated, the control unit 20 immediately executes the imaging process of the task 2. When the imaging process of the task 1 has not been terminated, the control unit 20 immediately executes the imaging process of the task 2 at the point of termination of the imaging process of the task 1. Accordingly, the sub-region allocating unit 20b allocates the sub region (hereinafter referred to as "task2-imaging use region") actually used for executing the imaging process of the task 2 in the main region for the task identical in type to the task 2, that is, the imaging region 23b (Step S35). That is, the sub-region allocating unit 20b allocates a task2-imaging use region 23f instead of the task1-imaging use region 23d (see FIG. 5A) in the imaging region 23b as illustrated in FIG. 5B.

Subsequently, at the time point when the execution of the printing process of the task 1 is terminated, that is, at the point when the recording medium printed by the task 1 is output by the printer 14, the control unit 20 deallocates the sub region having been used for processing the task 1, that is, the task1-printing use region 23e. Accordingly, the RAM 23 becomes the state illustrated in FIG. 5C.

Figure 6A:
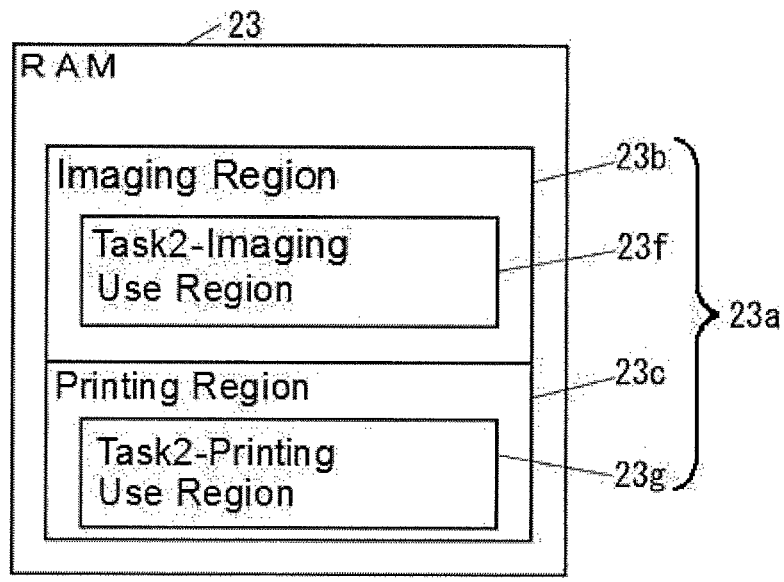
FIG. 6A is a schematic diagram illustrating a state where the task2-printing use region is allocated from the state illustrated in FIG. 5C.

Subsequently, when the execution of the imaging process of the task 2 is terminated and the printing process of the task 1 is terminated, the control unit 20 immediately executes the printing process of the task 2. When the execution of the imaging process of the task 2 is terminated and the printing process of the task 1 is not terminated, the control unit 20 immediately executes the printing process of the task 2 at the point of termination of the printing process of the task 1. Accordingly, the sub-region allocating unit 20b allocates the sub region (hereinafter referred to as "task2-printing use region") actually used for executing the printing process of the task 2 in the main region for the task identical in type to the task 2, that is, the printing region 23c (Step S35). That is, the sub-region allocating unit 20b allocates a task2-printing use region 23g in the printing region 23c as illustrated in FIG. 6A.

Subsequently, at the time point when the execution of the printing process of the task 2 is terminated, that is, at the point when the recording medium printed by the task 2 is output by the printer 14, the control unit 20 deallocates the sub region used for processing the task 2, that is, the task2-imaging use region 23f and the task2-printing use region 23g. Accordingly, the RAM 23 becomes the state illustrated in FIG. 6B.

Subsequently, when all the processes in the task 2 are terminated, the control unit 20 deallocates the imaging region 23b and the printing region 23c because all the main regions allocated for the respective processing items in the task 2, that is, all the sub regions in the imaging region 23b and the printing region 23c are deallocated. That is, the control unit 20 deallocates the guaranteed memory 23a and again becomes the state illustrated in FIG. 4A.

As described above, when the main region for the task identical in type to the new task as the execution target has been already allocated (Yes in Step S34), the main-region allocating unit 20a of the MFP 10 cancels the allocation (Step S32) of the main region for the new task. Subsequently, when the allocation of the main region for the new task is cancelled (Yes in Step S34), the sub-region allocating unit 20b allocates the sub region for the new task in the main region for the task identical in type to the new task (Step S35). With this configuration, when the main region has been already allocated for the task identical in type to the new task as the execution target, the MFP 10 reuses this main region to allocate the sub region for the new task. This eliminates the need for the time to additionally allocate the main region and promptly completes the execution of the task.

The MFP 10 can proceed with the execution for each of processing items in the task regarding a plurality of respective tasks. As illustrated in FIG. 5B, individual tasks can be simultaneously executed regarding a plurality of processing items. That is, the MFP 10 can execute a multi-task function. Accordingly, the MFP 10 can promptly complete the process of the task.

In particular, the MFP 10 can simultaneously execute a plurality of tasks for imaging and printing an image to reduce the occurrence of intermittent printing.

While in this embodiment the MFP 10 allocates the main region for the respective plurality of processing items in the task, the MFP 10 may allocate only one main region to one task. When the MFP 10 allocates only one main region to one task, the MFP 10 can reuse the main region to allocate the sub region for the new task to omit the operation to "once deallocate the main region and again allocate the main region for the new task" so as to promptly complete the process of the task.

When the RAM 23 has the free space with the size required for allocating the main region to execute the new task (YES in Step S31), the main-region allocating unit 20a of the MFP 10 additionally allocates the main region for the new task even if the main region has been already allocated for the task identical in type to the new task (Step S32). With this configuration, in the additionally allocated main region, the MFP 10 can instantly allocate the sub region actually used for executing the new task so as to promptly complete the process of the task.

Regardless of whether or not the RAM 23 has the free space with the size required for allocating the main region to execute the new task, when the main region has been already allocated for the task identical in type to the new task (Yes in Step S34), the MFP 10 may have the configuration that cancels the allocation (Step S32) of the main region for the new task and ensure allocation (Step S35) of the sub region for the new task in the main region for the task identical in type to the new task.

When the main region has been already allocated for the task identical in type to the new task as the execution target, the MFP 10 reuses this main region to allocate the sub region for the new task so as to improve the use efficiency of the RAM 23. Accordingly, when the main region has not been allocated yet for the task identical in type to the new task as the execution target, the MFP 10 is likely to be capable of allocating the main region for the new task to the free-space region of the RAM 23. Accordingly, the MFP 10 is likely to be capable of simultaneously executing a plurality of types of tasks. That is, the MFP 10 can execute a multi-task function. For example, the MFP 10 can simultaneously execute the task for imaging and printing an image and the task for transmitting the image via the network communication unit 16.

While the electronic device of the disclosure is the MFP in this embodiment, the electronic device may be an image forming apparatus other than the MFP, for example, a printer-only machine, a copy-only machine, or a fax-only machine or may be an electronic device other than the image forming apparatus, for example, a Personal Computer (PC).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Figure 4B:
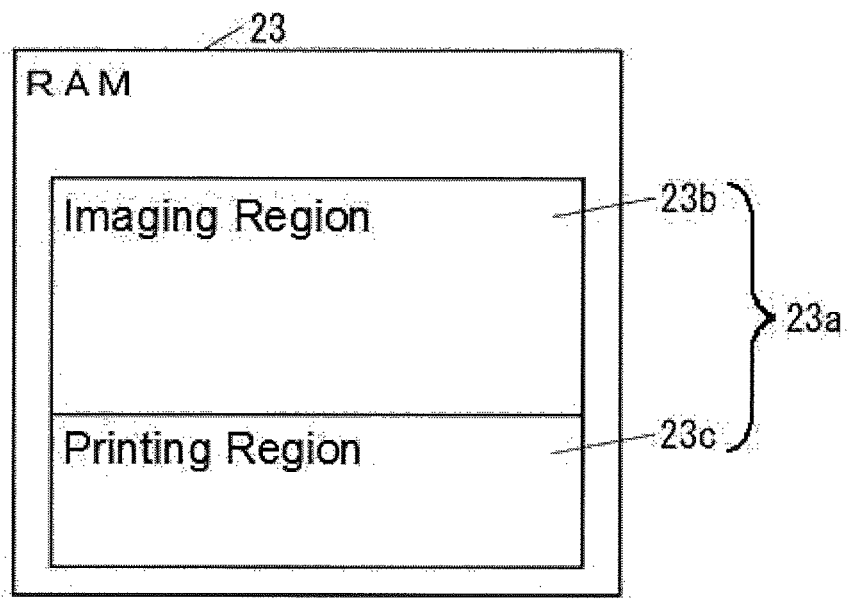
FIG. 4B is a schematic diagram illustrating a state where a guaranteed memory is allocated from the state illustrated in FIG. 4A.
Figure 4C:
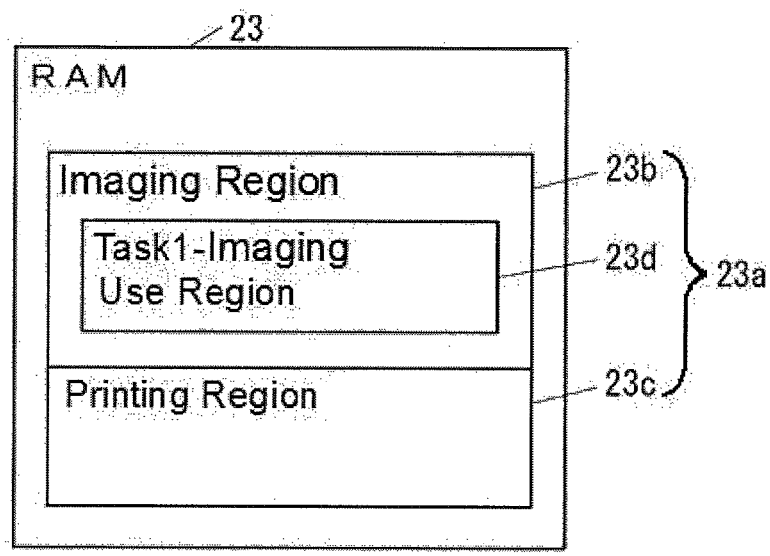
FIG. 4C is a schematic diagram illustrating a state where a task1-imaging use region is allocated from the state illustrated in FIG. 4B.
Figure 5C:
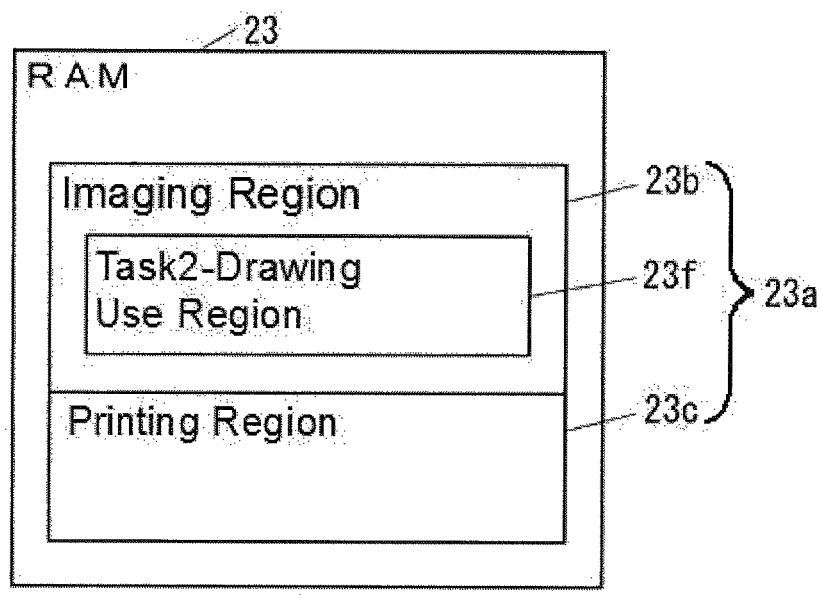
FIG. 5C is a schematic diagram illustrating a state where the task1-printing use region is deallocated from the state illustrated in FIG. 5B.
Figure 6B:
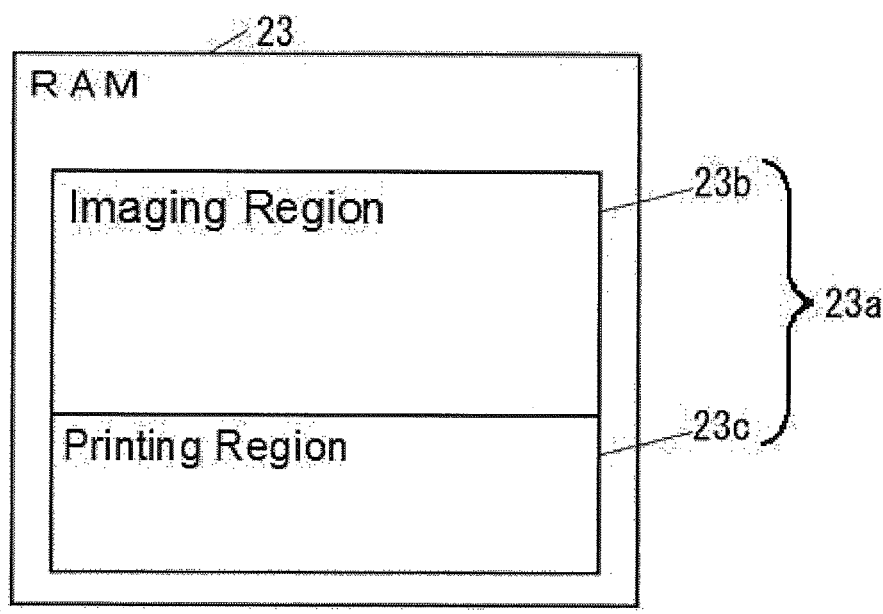
FIG. 6B is a schematic diagram illustrating a state where the task2-imaging use region and the task2-printing use region are deallocated from the state illustrated in FIG. 6A.

FIG. 1
20 Control Unit
11 Operation Unit
12 Display Unit
13 Scanner
14 Printer
15 Fax Communication Unit
16 Network Communication Unit
17 Storage Unit
17a Memory-Management Program
FIG. 2
20 Control Unit
20a Main-Region Allocation Unit
20b Sub-Region Allocation Unit
FIG. 3
S31 Does RAM have free space with size required for allocating main region to execute new task?
S32 Allocate main region
S33 Allocate sub region
S34 Has main region been already allocated for task identical in type to new task?
S35 Allocate sub region
FIG. 4B
23a Guaranteed Memory
23b Imaging Region
23c Printing Region
FIG. 4C
23a Guaranteed Memory
23b Imaging Region
23d Task1-Imaging Use Region
23c Printing Region
FIG. 5A
23a Guaranteed Memory
23b Imaging Region
23d Task1-Imaging Use Region
23c Printing Region
23e Task1-Printing Use Region
FIG. 5B
23a Guaranteed Memory
23b Imaging Region
23f Task2-Imaging Use Region
23c Printing Region
23e Task1-Printing Use Region
FIG. 5C
23a Guaranteed Memory
23b Imaging Region
23f Task2-Imaging Use Region
23c Printing Region
FIG. 6A
23a Guaranteed Memory
23b Imaging Region
23f Task2-Imaging Use Region
23c Printing Region
23g Task2-Printing Use Region
FIG. 6B
23a Guaranteed Memory
23b Imaging Region
23c Printing Region

What is claimed is:

1. An image forming apparatus comprising:
a memory as a Random Access Memory (RAM):
a main-region allocation unit:
and a sub-region allocation unit,
wherein the main-region allocation unit: 1) determines a size required for allocating a main region in the RAM to execute a first task based on one of i) a size of a maximum paper sheet used in the first task, and ii) a size of a document used in the first task read by a scanner; 2) determines whether the RAM has a free space with the size required for allocating the main region to execute the first task; and 3) allocates the main region in the RAM for executing the first task, when the RAM has the free space with the size required for allocating the main region, and
the sub-region allocation unit allocates one or more sub-regions in the main region, the one or more sub region being actually used to execute the first task,
wherein, if the first task is a task for imaging and printing an image,
(A) the main-region allocation unit allocates a guaranteed memory that includes the main region for the first task, and
(B) the sub-region allocation unit 1) allocates a first sub region of the main region for the imaging process of the first task, and 2) allocates a second sub region of the main region for the printing process of the first task,
wherein, if the main region allocation unit determines that the RAM does not have the free space with the size required for allocating the main region to execute a second task as a new task, and the second task is a task for imaging and printing an image, the main region allocation unit determines whether the first task has completed using the main region, and if the first task has completed using the main region, then the main region allocation unit reallocates the main region to the second task, and the sub-region allocation unit reallocates the first sub-region for the imaging process of the second task and reallocates the second sub-region for the printing process of the second task.

2. A method for managing a memory for an image forming apparatus that includes a memory as a Random Access Memory (RAM), a main-region allocation unit, and a sub-region allocation unit, the method comprising:
via the main-region allocation unit, 1) determining a size required for allocating a main region in the RAM to execute a first task based on one of i) a size of a maximum paper sheet used in the first task, and ii) a size of a document used in the first task read by a scanner; 2) determining whether the RAM has a free space with the size required for allocating the main region to execute the first task; and 3) allocating the main region in the RAM for executing the first task, when the RAM has the free space with the size required for allocating the main region, and the sub-region allocation unit allocates one or more sub regions in the main region, the one or more sub regions being actually used to execute the first task:
wherein, if the first task is a task for imaging and printing an image,
(A) via the main-region allocation unit, allocating a guaranteed memory that includes the main region for the first task, and (B) via the sub-region allocation unit, 1) allocating a first sub region of the main region for the imaging process of the first task, and 2) allocates a second sub region of the main region for the printing process of the first task, and via the main-region allocation unit, if the RAM does not have the free space with the size required for allocating the main region to execute a second task as a new task, and the second task is a task for imaging and printing an image, the main region allocation unit determines whether the first task has completed using the main region, and if the first task has completed using the main region, then the main region allocation unit reallocates the main region to the second task, and the sub-region allocation unit reallocates the first sub-region for the imaging process of the second task and reallocates the second sub-region for the printing process of the second task.

3. A non-transitory computer-readable recording medium storing a control program for controlling an image forming apparatus including a memory as a Random Access Memory (RAM), the control program causing the image forming apparatus to function as a main-region allocation unit and a sub-region allocation unit, wherein the main-region allocation unit: 1) determines a size required for allocating a main region in the RAM to execute a first task based on one of i) a size of a maximum paper sheet used in the first task, and ii) a size of a document used in the first task read by a scanner; 2) determines whether the RAM has a free space with the size required for allocating the main region to execute the first task; and 3) allocates the main region in the RAM for executing the first task, when the RAM has the free space with the size required for allocating the main region, and the sub-region allocation unit allocates one or more sub regions in the main region, the one or more sub regions being actually used to execute the first task, wherein, if the first task is a task for imaging and printing an image, (A) the main-region allocation unit allocates a guaranteed memory that includes the main region for the first task, and (B) the sub-region allocation unit 1) allocates a first sub region of the main region for the imaging process of the first task, and 2) allocates a second sub region of the main region for the printing process of the first task, wherein, if the main region allocation unit determines that the RAM does not have the free space with the size required for allocating the main region to execute a second task as a new task, and the second task is a task for imaging and printing an image, the main region allocation unit determines whether the first task has completed using the main region, and if the first task has completed using the main region, then the main region allocation unit reallocates the main region to the second task, and the sub-region allocation unit reallocates the first sub-region for the imaging process of the second task and reallocates the second sub-region for the printing process of the second task.

* * * * *